United States Patent [19]
Rahman

[11] 4,418,294
[45] Nov. 29, 1983

[54] SUPERSONIC MHD GENERATOR SYSTEM

[76] Inventor: Muhammed A. Rahman, 1850 Columbia Pike, Apt. #129, Arlington, Va. 22204

[21] Appl. No.: 394,806

[22] Filed: Jul. 2, 1982

[51] Int. Cl.³ .......................................... H02K 44/00
[52] U.S. Cl. ..................................................... 310/11
[58] Field of Search ........................................... 310/11

[56] References Cited

U.S. PATENT DOCUMENTS

| | | | |
|---|---|---|---|
| 3,294,989 | 12/1966 | Eichenberger | 310/11 |
| 3,350,584 | 10/1967 | Brocher et al. | 310/11 |
| 3,432,692 | 3/1969 | Chevalley | 310/11 |
| 3,527,055 | 9/1970 | Rego | 310/11 |
| 3,622,817 | 11/1971 | Isaacson | 310/11 |
| 3,678,306 | 7/1972 | Garnier et al. | 310/11 |
| 3,895,243 | 7/1975 | Amend et al. | 310/11 |
| 4,274,019 | 6/1981 | Aladier et al. | 310/11 |

Primary Examiner—Donovan F. Duggan

[57] ABSTRACT

An improved MHD electrical power generating system of the type having a MHD topping cycle and a steam generating bottoming cycle is disclosed. The system typically includes a combustion system, a conventional MHD generator and a first diffuser radiant boiler. The improvement comprises a first supersonic MHD generator and ramjet engine configuration operatively connected in series with each other and with the conventional MHD generator. The first supersonic MHD generator and ramjet engine configuration increase the power output and improve the operating efficiency of the electrical generating system. A diffuser system is also disclosed which is in fluid communication with the supersonic MHD generator and the ramjet engine for collecting bypass plasma gas to be used for heating a second radiant boiler adapted for powering a steam turbine generator.

4 Claims, 1 Drawing Figure

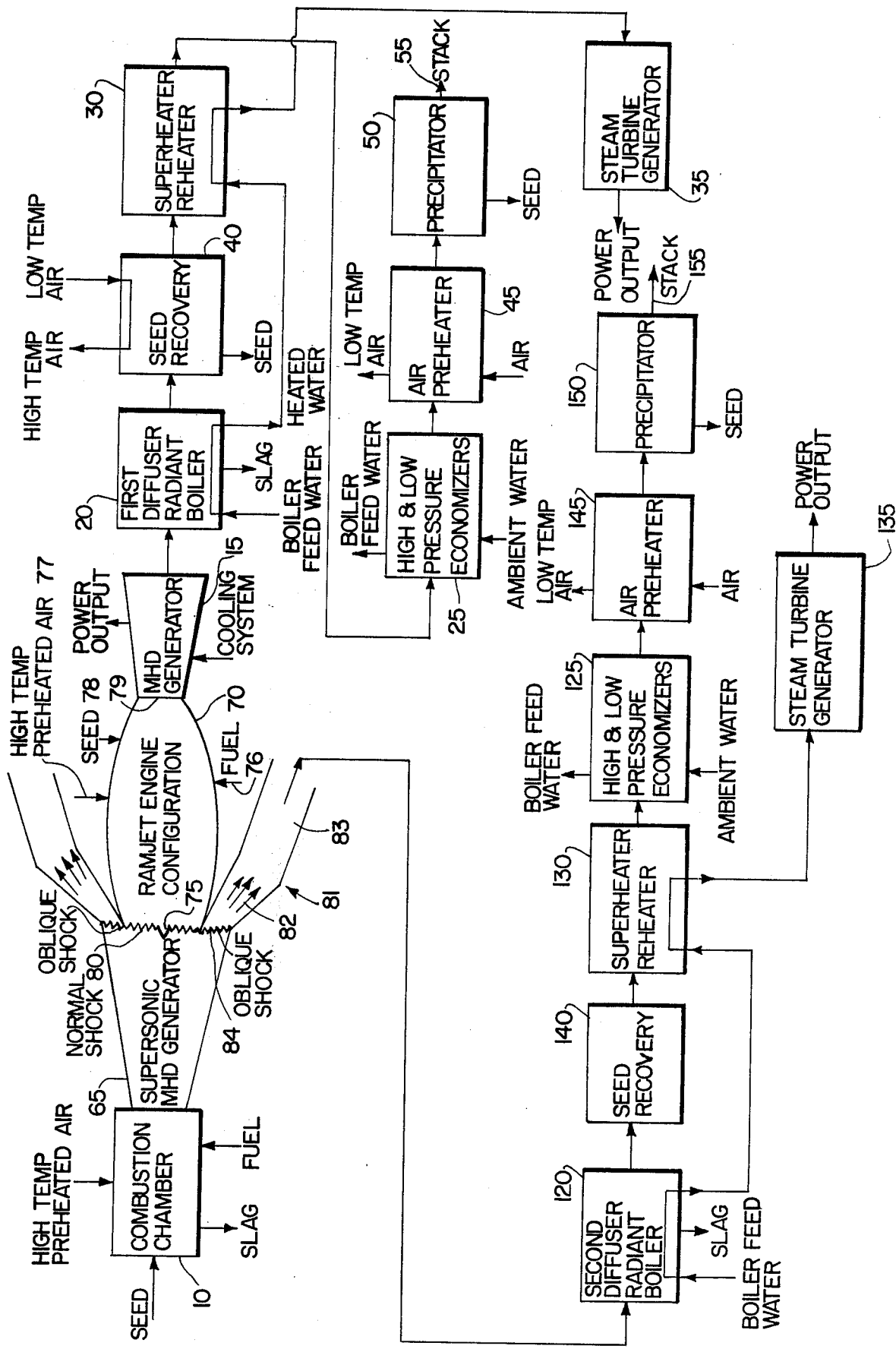

SUPERSONIC MHD GENERATOR SYSTEM

BACKGROUND OF THE INVENTION

Field of the Invention

This invention relates to an improved MHD electrical power generating system which incorporates a ramjet engine and a supersonic MHD generator in series with a conventional MHD generator, and a diffuser assembly for collecting and feeding by-pass plasma gas from the supersonic MHD generator to a second radiant boiler adapted to power a steam turbine generator. This system increases the power output and improves the operating efficiency of the electrical power generating system.

SUMMARY OF THE INVENTION

An object of the present invention to provide an improved MHD electric power generating system by incorporating a supersonic MHD generator and ramjet engine upstream of and in series with a conventional MHD generator.

Another object is to provide an improved electrical power generating system by incorporating two MHD generators in series, thereby permitting the closing off of either MHD generator for maintenance or repair without necessitating the shutting down of the electric power generating system.

Still another object is to provide a MHD electric power generating system which is more efficient than those currently known.

A still further object is to provide a MHD electric power generating system which incorporates a diffuser element in fluid communication with a supersonic MHD channel and a ramjet engine for collecting by-pass plasma gas to be used either for heating a supplemental radiant boiler adapted for powering a steam turbine generator, for district heating, or for a liquid metal MHD system.

Another further object is to provide an improved MHD electric power generating system having a conventional MHD generator that is supplied with plasma gas by a ramjet engine which is powered by exit gas from a supersonic MHD generator.

More specifically, the present invention is directed to an improved MHD electric power generating system of the type having a MHD topping cycle and a steam generating bottoming cycle and including a first radiant boiler. A first supersonic MHD generator and a ramjet engine in series with the first supersonic MHD channel increases the power output and improves the operating efficiency of the electric power generating system. A diffuser system is also incorporated which is in fluid communication with the supersonic MHD channel and the ramjet engine for collecting by-pass plasma gas adapted to be used for heating a radiant boiler and thereby further improving the system efficiency.

BRIEF DESCRIPTION OF THE DRAWING

These and other objects and advantages will become more fully apparent as the following description is read in conjunction with the drawing wherein:

The FIGURE is a schematic illustration, partly in section, of an improved MHD electric power generating system according to a preferred embodiment of the invention.

DETAILED DESCRIPTION OF THE PREFERRED EMBODIMENT OF THE INVENTION

Referring now to the drawing, the FIGURE illustrates a magnetohydrodynamic (MHD) electric power generating system according to the present invention. As is known, a combustion chamber 10 is supplied with fossil fuel such as coal gas, natural gas or any other high energy fuel. This fuel is burned in the presence of high temperature preheated air or enriched oxygen. A seed material such as potassium carbonate is also introduced to improve the electrical conductivity of the combustion or plasma gas produced in the combustion chamber 10. If coal fuel is employed, then slag is removed from the combustion chamber 10.

In prior art systems, the combustion or plasma gas produced in the combustion chamber 10 would then be introduced directly into a conventional MHD generator such as MHD generator 15 for MHD conversion to generate electrical energy. The plasma exhaust from the MHD generator 15 is supplied to a diffuser radiant boiler 20 where the plasma gas slows down and loses conductivity. The heat from the plasma gas is used to convert boiler feed water from high and low pressure economizers 25 to steam. The steam is then transferred through a superheater 30 to a first steam turbine generator 35.

The plasma gas continues from the diffuser radiant boiler 20 through seed recovery unit 40, superheater 30, high and low pressure economizers 25, air preheater 45, precipitator 50 and out the stack 55.

According to the present invention, the plasma gas formed in the combustion chamber 10, before passing to the conventional MHD generator 15, first enters a supersonic MHD generator 65 positioned in series therewith. The first supersonic MHD generator 65 has a mach number of at least approximately 1.5.

A ramjet engine configuration 70 having a supersonic inlet 75 fluidly connects the first supersonic MHD generator 65 with the MHD generator 15 inlet. After exiting from the supersonic MHD generator 65, a portion of the plasma gas passes through the supersonic inlet 75. The plasma gas is continuously rammed through inlet 75 where it encounters a normal shock illustrated at 80 which compresses the gas without the use of any moving parts. The thusly compressed plasma gas becomes very hot and subsonic diffusion follows within the ramjet diffusers. This high temperature compressed exhaust plasma gas is used to burn fuel 76 in the presence of high temperature air or enriched oxygen 77. Seed 78 is introduced to increase the electrical conductivity of the combustion gas or plasma, which is then transferred from the ramjet engine outlet nozzle 79 into the second MHD generator 15.

According to another important feature of the invention, a diffuser 81 shown diagramatically in section is provided. The diffuser, which surrounds the frontal section of the ramjet engine 70, is preferable comprised of a portion 82 having an area of continuously increasing cross-section and a constant area transition or spoiler section 83.

Bypass plasma gas, that is, plasma gas exiting from supersonic MHD generator 65 but not entering ramjet engine inlet 75, enter the diffusion 81. Before entering the diffuser 81 the bypass plasma gas encounters an oblique shock 84 and then enters the diverging area portion 82. From portion 82 the bypass plasma gas enters the spoiler section 83 where the gas further decelerates to a suitable velocity for entry to a second diffuser radiant boiler 120. The bypass plasma gas proceeds from the diffuser radiant boiler 120 through the seed recovery unit 140, superheater/reheater 130, high and low pressure economizers 125, air preheater 145, precipitator 150 and out the stack 155 in a manner similar to the first system. Boiler feed water passes through the second diffuser radiant boiler 120 and superheater/reheater 130 where it is converted to steam which is then transferred to a second steam turbine generator 135. Alternatively, the superheated steam could be used directly for heating homes and businesses in surrounding areas.

The present invention may be embodied in other specific forms without parting from the spirit or the essential characteristics thereof. The presently disclosed embodiments are, therefore, to be considered in all respects as illustrative and not restrictive, the scope of the invention being indicated by the appended claims rather than by the foregoing description and all changes which come within the meaning and range of equivalency of the claims are, therefore, to be embraced therein.

What is claimed is:

1. An improved MHD power generating system of the type having a MHD topping cycle and a steam generating bottoming cycle and including a combustion system, at least one conventional MHD generator and a first radiant boiler in fluid communication with the secondary MHD generator, wherein the improvement comprises a first supersonic MHD generator and a ramjet engine operatively connected in series with said first supersonic MHD generator, said ramjet engine fluidly coupling said supersonic MHD generator with said conventional MHD generator for increasing the power output and improving the operating efficiency of the electric power generating system.

2. An improved MHD electric power generating system as claimed in claim 1, further comprising a second radiant boiler adapted for powering a steam turbine generator and diffuser means fluidly communicating said first supersonic MHD channel with said ramjet engine, said diffuser means being adapted to collect bypass plasma gas from the first supersonic MHD channel for heating said second radiant boiler.

3. An improved MHD electric power generating system claimed in claim 2, wherein said diffuser means comprises a first funnel shaped portion adapted for causing an oblique shock wave to slow the bypass plasma gas and a second constant area transition section, said constant area transition section being adapted to further decelerate the by-pass plasma gas.

4. An improved MHD electric power generating system as claimed in claim 3, wherein said first supersonic MHD generator has a mach number of at least approximately 1.5.

* * * * *